United States Patent
Polach et al.

(10) Patent No.: US 8,571,784 B2
(45) Date of Patent: Oct. 29, 2013

(54) METHOD FOR CONTROLLING A FUEL INJECTOR OF A DIESEL ENGINE

(75) Inventors: Stefan Polach, Stuttgart (DE); Dara Torkzadeh, Untergruppenbach (DE)

(73) Assignee: Robert Bosch GmbH, Suttgart (DE)

( * ) Notice: Subject to any disclaimer, the term of this patent is extended or adjusted under 35 U.S.C. 154(b) by 1006 days.

(21) Appl. No.: 12/085,970

(22) PCT Filed: Oct. 19, 2006

(86) PCT No.: PCT/EP2006/067562
§ 371 (c)(1),
(2), (4) Date: Oct. 28, 2009

(87) PCT Pub. No.: WO2007/062914
PCT Pub. Date: Jun. 7, 2007

(65) Prior Publication Data
US 2010/0042309 A1 Feb. 18, 2010

(30) Foreign Application Priority Data

Dec. 2, 2005 (DE) .......................... 10 2005 057 571

(51) Int. Cl.
*F02D 41/30* (2006.01)
*F02M 25/07* (2006.01)
*G06F 19/00* (2011.01)

(52) U.S. Cl.
USPC ....... 701/105; 123/435; 123/478; 123/568.21

(58) Field of Classification Search
USPC .................. 701/101–105, 110–114, 108; 123/406.11, 406.19, 406.3, 406.33, 123/406.47, 406.53, 406.72, 568.11, 123/568.16, 435, 478, 480, 486, 491, 123/568.21; 702/182, 183, 185
See application file for complete search history.

(56) References Cited

U.S. PATENT DOCUMENTS

| | | | |
|---|---|---|---|
| 6,240,890 B1 * | 6/2001 | Abthoff et al. | 123/179.3 |
| 6,273,056 B1 * | 8/2001 | Shirakawa et al. | 123/305 |
| 6,367,456 B1 * | 4/2002 | Barnes et al. | 123/501 |
| 6,877,485 B2 * | 4/2005 | Fischer | 123/472 |
| 7,178,505 B2 * | 2/2007 | Shimazaki et al. | 123/406.47 |
| 7,272,487 B2 * | 9/2007 | Christen et al. | 701/108 |
| 2002/0011240 A1 * | 1/2002 | Kimura | 123/501 |
| 2003/0111041 A1 * | 6/2003 | Kimura | 123/295 |
| 2003/0131822 A1 * | 7/2003 | Fischer | 123/435 |
| 2006/0064226 A1 * | 3/2006 | Damitz et al. | 701/103 |
| 2006/0064230 A1 * | 3/2006 | Damitz et al. | 701/105 |
| 2007/0106449 A1 * | 5/2007 | Schueler et al. | 701/103 |

FOREIGN PATENT DOCUMENTS

| | | |
|---|---|---|
| DE | 195 26 516 | 2/1996 |
| DE | 195 36 110 | 4/1997 |
| EP | 1 199 460 | 4/2002 |
| EP | 1 475 526 | 11/2004 |
| EP | 1 582 729 | 10/2005 |
| JP | 8-49583 | 2/1996 |
| JP | 2005-291001 | 10/2005 |

* cited by examiner

*Primary Examiner* — Willis R Wolfe, Jr.
*Assistant Examiner* — Johnny Hoang
(74) *Attorney, Agent, or Firm* — Kenyon & Kenyon LLP

(57) ABSTRACT

A method for controlling a fuel injector of a diesel engine having a predefined control time from a control start, in which a setpoint value of a combustion start of a combustion chamber charge of the diesel engine is ascertained. The method is characterized in that an ignition delay between the control start and the combustion start is estimated from performance parameters of the diesel engine using a computing model, and the control start is formed on the basis of the setpoint value of the combustion start and the estimated ignition delay. A control unit controls the sequence of the method.

18 Claims, 2 Drawing Sheets

METHOD FOR CONTROLLING A FUEL INJECTOR OF A DIESEL ENGINE

FIELD OF THE INVENTION

The present invention relates to a method for controlling a fuel injector of a diesel engine having a predefined control time from a control start, a setpoint value for a combustion start of a combustion chamber charge of the diesel engine being ascertained. The present invention also relates to a control unit which controls the sequence of such a method.

BACKGROUND INFORMATION

Such a method and such a control unit are discussed in German patent document DE 195 36 110 A1. In this method, the setpoint value is determined from measured performance parameters of the diesel engine, an actual value is determined from signals of different sensors, and the actual value is regulated to the setpoint value in a closed loop. The manipulated variable for the regulation is activated at the beginning of a signal which triggers the injector for an injection. The beginning of this signal is referred to in the following as control start.

Basic values for the control start are stored for this purpose in a characteristics map, for example, which is addressed via performance parameters of the diesel engine. There is the so-called on-delay or dead time of the injector and the so-called ignition delay between the control start and the combustion start. The on-delay depends on the design of the injector and corresponds to a delay of the injector in responding to the control signal by starting an injection. The ignition delay is between this injection start and an actual beginning of the combustion, i.e., the combustion start. In the diesel engine, the combustion start is, as known, triggered by a self-ignition of the fuel injected into the combustion chamber charge heated by compression.

These influences may be taken into account when establishing the characteristics map values or by correcting the read-out values. The correction may take place by a regulation intervention or by linking to correction values determined as a function of performance parameters.

It has been found that in the known method, in particular at operating point transitions, uneven engine operation occurs.

In contrast, the method according to the present invention is characterized in that an ignition delay between the control start and the combustion start is estimated from performance parameters of the diesel engine using a computing model and the control start is formed from the setpoint value for the combustion start and the estimated ignition delay. The control unit according to the present invention is characterized in that it controls the sequence of such a method.

SUMMARY OF THE INVENTION

Estimating the ignition delay using a computing model which processes performance parameters of the diesel engine provides an overall approximation of the actual value of the combustion start to its setpoint value. In a diesel engine which operates without regulation of the combustion start this results in improved smoothness of operation and a more efficient engine operation in a broad range of operating states and transitions between operating states. In diesel engines having combustion start regulation, substantial improvement of the smoothness of operation results at the transition between different operating points and/or combustion methods because the basic values for the control start which is to result in a defined combustion start are linked to an immediately effective combustion delay correction.

In contrast, the correction of a structure via regulation, which acts as a supplement and works with setpoint values for a control start has disadvantages: When it responds rapidly, overswing may occur in non-steady-state operation, which has a negative effect on the operating response of the diesel engine. In contrast, when overswing is prevented, the regulation acts excessively slowly in order to be able to effectively compensate for erroneous adjustments in the event of rapid changes in the operating point.

In order to be able to better control the combustion start even in steady-state operating states, the method may be combined with regulation of the combustion start.

In order to comply with future exhaust gas standards, it will be necessary to operate diesel engines in different operating ranges using different combustion methods. In particular, a distinction is made between lean operation using layered and therefore non-homogeneous fuel distribution in the combustion chamber and homogeneous operation with homogeneous fuel distribution. Homogeneous fuel distribution is at least in part achieved via increased ignition delay. Increased ignition delay is produced via a high exhaust gas recirculation rate and thus via increased inert gas content in the combustion chamber charge.

At sufficiently high exhaust gas recirculation rates, interactions between different factors influencing the ignition delay occur. The influence of increased combustion chamber charge which would rather decrease the ignition delay is changed by the inert gas content resulting from the exhaust gas recirculation. At the same time, the temperature effect of the recirculated exhaust gas changes the temperature of the combustion chamber charge. Therefore, in particular the ignition delay may be estimated using a physical model, which simulates the combined effects of at least two performance parameters of the diesel engine.

Further advantages result from the description and the appended figures. Exemplary embodiments of the present invention are illustrated in the drawings and explained in greater detail in the description that follows.

It is understood that the above-named features to be elucidated below are usable not only in the given combination, but also in other combinations or by themselves without leaving the scope of the exemplary embodiments and/or exemplary methods of the present invention.

DETAILED DESCRIPTION

Figure 1:
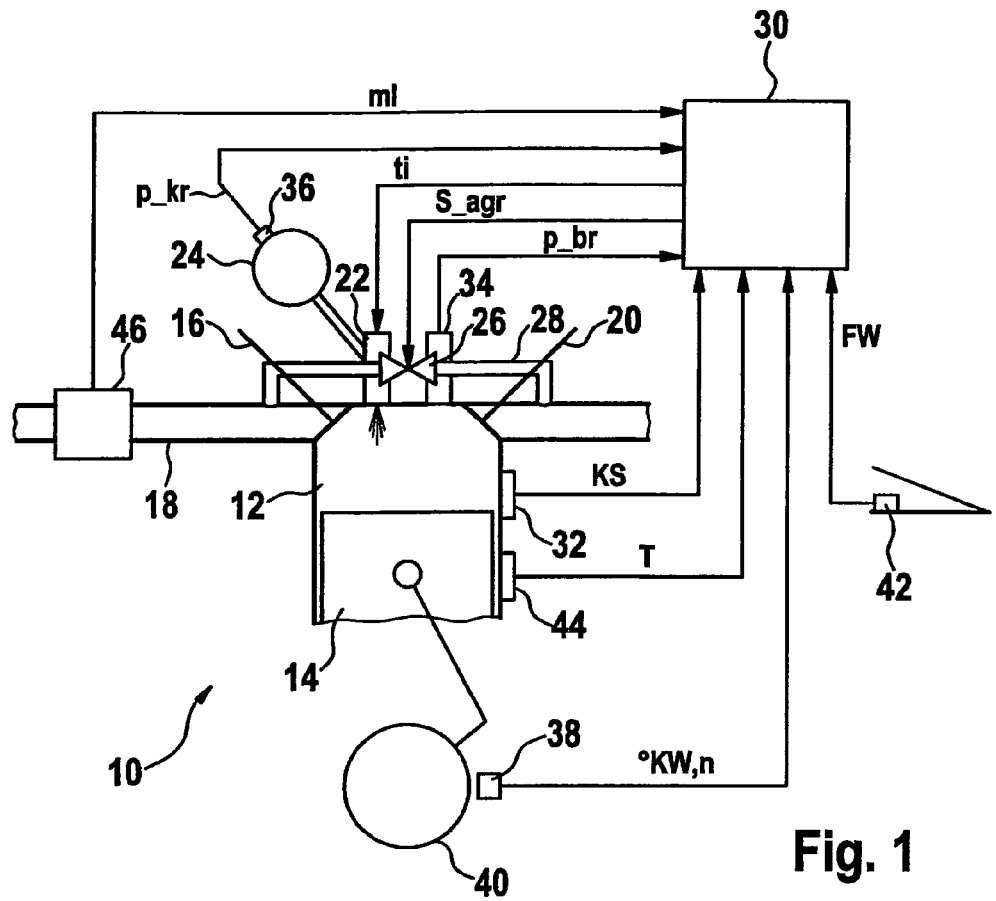
FIG. 1 schematically shows the technical field of the exemplary embodiments and/or exemplary methods of the present invention.

In particular, FIG. 1 shows a diesel engine 10 having at least one combustion chamber 12, which is movably sealed by a piston 14. Combustion chamber 12 is filled with air from an intake manifold 18 via an intake valve 16. Combusted gases are expelled via a discharge valve 20. Fuel from pressurized fuel reservoir 24 is injected via an injector 22 to the combustion chamber charge compressed in the compression cycle. Furthermore, exhaust gas is supplied to combustion chamber 12 via an exhaust gas recirculation valve 26 in exhaust gas recirculation 28. Injector 22 and exhaust gas recirculation valve 26 are controlled by a control unit 30, which processes signals of different sensors for this purpose. In FIG. 1, these are combustion feature sensors 32 and/or 34, a fuel pressure sensor 36, an angle sensor system 38 on a component 40 which rotates synchronously with the cycles of diesel engine 10, a driver's intent transducer 42, a temperature sensor 44, and an air mass flow meter 46.

Component 40 is, for example, a flywheel non-rotatably connected to a crankshaft of diesel engine 10. In another embodiment, it may, however, be connected to a camshaft of diesel engine 10. It is understood that actual diesel engines 10 may have further sensors such as exhaust gas temperature sensors. Furthermore, not every diesel engine 10 has to have all sensors 32 through 46. The combustion start may be regulated, for example, on the basis of the signal of only one combustion feature sensor 32 or 34. The other sensor is then unnecessary. When the control start is adjusted in an open control chain, both combustion feature sensors 32, 34 may be omitted. Air mass flow meter 46 is also not absolutely necessary.

It is, however, essential for understanding the exemplary embodiments and/or exemplary methods of the present invention that, from the sensor signals supplied, control unit 30 outputs control signals in the form of pulse widths ti for injections using which fuel is metered for combustion in combustion chamber 12 and in the form of signals S_agr for controlling exhaust gas recirculation valve 26.

Combustion feature sensor 34 is a combustion chamber pressure sensor which delivers a combustion chamber pressure p_br, while combustion feature sensor 32 which is present as an alternative or additionally, is a structure-borne noise sensor which delivers a structure-borne noise signal KS. Fuel pressure sensor 36 signals the fuel pressure or injection pressure p_kr. In the embodiment of FIG. 1, angle sensor system 38 delivers crankshaft angle information ° KW as information about the position of piston 14 in its operating cycle. It is understood that this information may be derived not only from the crankshaft angle information, but, for example, also from camshaft angle information. Information about rotational speed n of the diesel engine may also be derived from angle signal ° KW. Driver's intent FW represents a measure for a torque request by the driver and is detected, for example, as a gas pedal position by driver's intent transducer 42. An engine temperature T is provided by temperature sensor 44. Air mass flow meter 46 delivers a measure of air mass ml entering combustion chamber 12.

Figure 2:
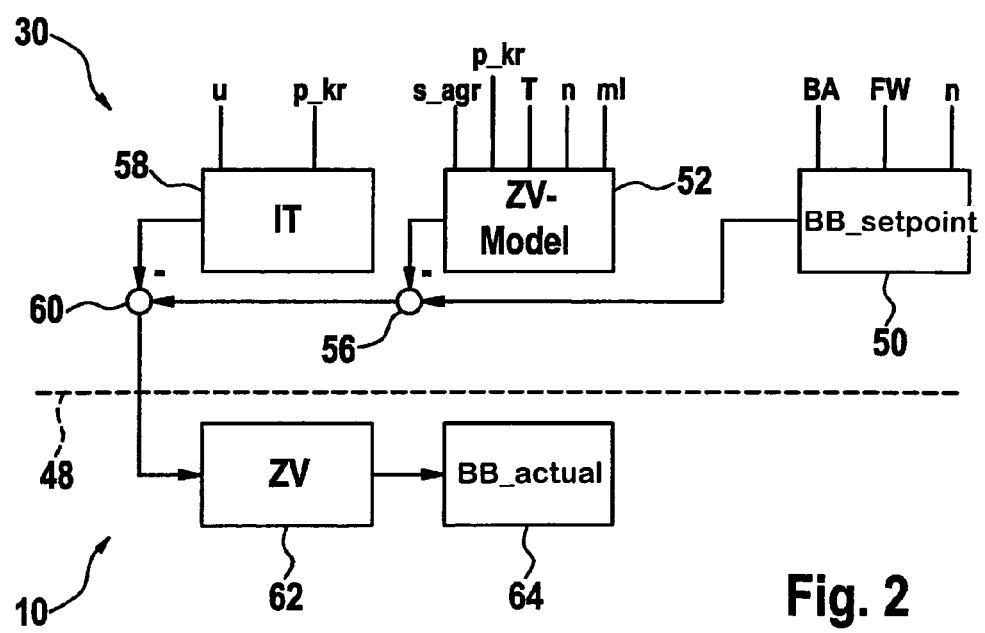
FIG. 2 schematically shows a first exemplary embodiment of a method according to the present invention for adjusting the combustion start via an open control chain.

FIG. 2 shows a first exemplary embodiment of a method for setting the combustion start. In this embodiment, the combustion start is set using an open control chain. Dashed line 48 separates functions of control unit 30 from functions of diesel engine 10. A setpoint value BB_setpoint for the combustion start of the combustion to be triggered with the next injection is initially determined in block 50. It is ascertained as a function of the signals in control unit 30, in particular as a function of rotational speed n and a torque request as defined by driver's intent FW.

In diesel engines which are operated in different operating modes such as lean operation using layered fuel distribution or homogeneous operation using homogeneous fuel distribution in combustion chamber 12, combustion start setpoint default value BB_setpoint is specified in addition as a function of a signal BA specifying the operating mode. The default value may be specified via access to a characteristics map stored in control unit 30 which is addressed via the above-mentioned variables and optionally additional variables. A torque request default value may be used as additional variable, for example, which is generated in control unit 30 independently of driver's intent FW. Such torque request default values are used, for example, for supporting shifting sequences in automatic transmissions. Another example of a further variable is a signal that causes a desired efficiency reduction for heating exhaust gas treatment components by retarding the combustion start and thus the combustion center of gravity.

Setpoint value BB_setpoint output by block 50 is corrected via a computation model for the ignition delay, which is represented by block 52 and is also referred to in the following as ignition delay model. Ignition delay model 52 emulates the ignition delay on the basis of performance parameters which characterize the state of the combustion chamber charge before and during the injection. Essential state variables are in this context the gas mass contained in the combustion chamber, its oxygen content, and its temperature. The ignition delay model reduces the modeled ignition delay with increasing combustion chamber charge (gas mass), increasing oxygen content, decreasing droplet size of the injected fuel, and increasing temperature of the combustion chamber charge, and thus emulates the behavior of the actual ignition delay.

The combustion chamber charge is essentially obtained from the mass of aspired air normalized to an intake stroke of piston 14, and the quantity of the exhaust gas recirculated into a combustion chamber charge. The mass of aspired air is obtained as a function of signal ml of air mass flow meter 46 and rotational speed n. Similarly, the recirculated exhaust gas mass in a combustion chamber charge may be ascertained from signal S_agr which controls the exhaust gas recirculation and rotational speed n.

The temperature is substantially influenced by the compression heat and by heat transfers from combustion chamber walls to the combustion chamber charge. The compression heat is a function of the combustion chamber charge, and the temperature effect of the heat transfers is a function of temperature T of diesel engine 10. The droplet size is a function of injection pressure p_kr.

Interactions occur between the individual influencing variables. A high exhaust gas recirculation rate thus has a greater influence when there is a little fresh air mass in the combustion chamber than in the case of a larger fresh air mass. The effect of the exhaust gas recirculation on the combustion chamber temperature also depends on the mass of fresh air in the combustion chamber. In an exemplary embodiment, the ignition delay is estimated using a computing model, which simulates the combined effects of at least two performance parameters of the diesel engine. One of the at least two performance parameters may be an exhaust gas recirculation rate.

As mentioned previously, the exhaust gas recirculation rate influences the combustion chamber charge and/or the temperature of the combustion chamber charge in particular. Due to the combined effects of these parameters, the combustion chamber charge and/or the temperature may be used as second or additional parameters in forming the model. In one embodiment, the inert gas content in a combustion chamber charge resulting from the exhaust gas recirculation is taken into account in estimating an effect of the combustion chamber charge on the ignition delay. Alternatively or additionally, a temperature increase of the combustion chamber charge resulting from the exhaust gas recirculation rate is taken into account in estimating an influence of the temperature of the combustion chamber charge.

An ignition delay formed using ignition delay model 52 is subtracted from the setpoint value of the combustion start from block 50. In the function structure of FIG. 2, the subtraction is performed in node 56. If zero is assigned as a fixed angular position to top dead center TDC of piston 14 in the compression stroke, the setpoint values for the combustion start that usually precede the TDC have a negative sign. By subtracting the absolute value of the ignition delay in node 56, a setpoint value for the injection start is formed, which is chronologically before the setpoint value of the combustion start.

An on-delay or injector dead time IT, which elapses between the time the injector is triggered and the time a flow cross-section in injector 22 actually opens, is subtracted from this setpoint value of the injection start. This injector dead time may be a function of the battery voltage and/or supply voltage u and fuel pressure p_kr, with whose help injection pulse widths are formed for an injector 22. In FIG. 2, such an injector dead time is formed in block 58 and subtracted from the setpoint value of the injection start in node 60. The result of node 60 is the actual control start starting at which an injector 22 having an opening injection pulse width ti must be controlled in order to implement a desired combustion start after an actually occurring ignition delay ZV. In FIG. 2, block 62 represents the actual ignition delay ZV and block 64 the actual combustion start and thus an actual value BB_actual of the combustion start.

Figure 3:
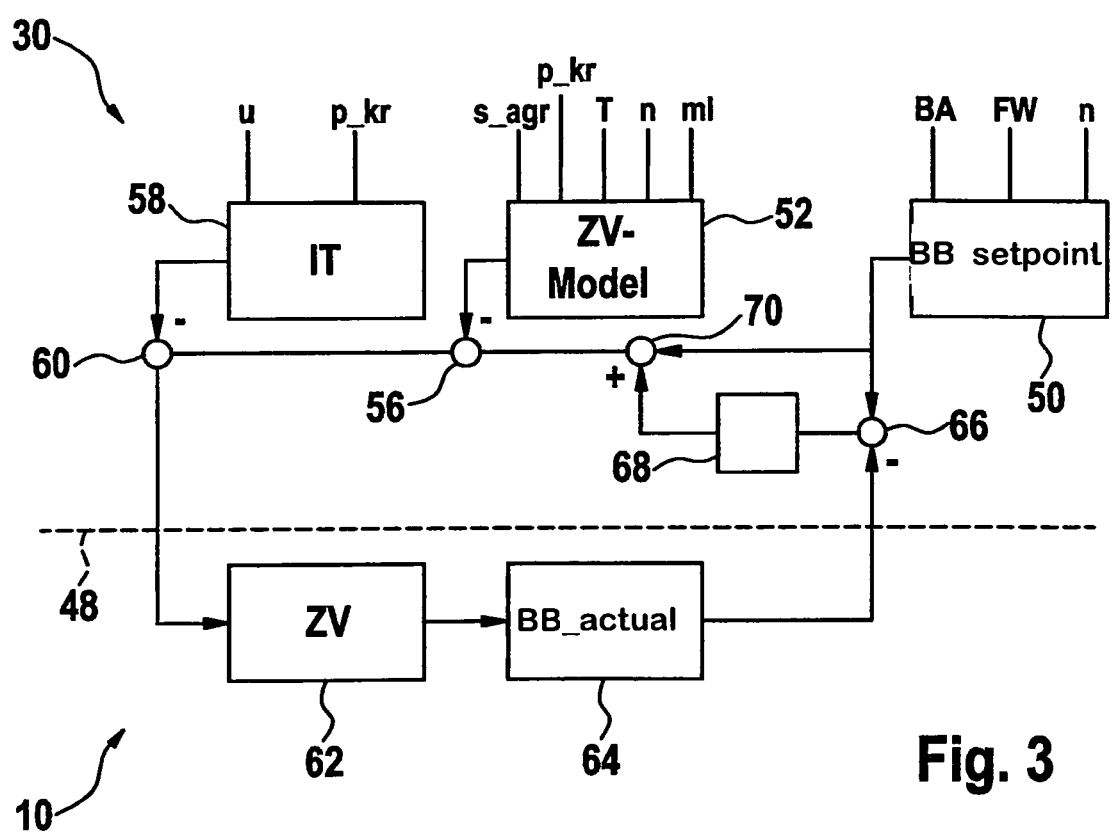
FIG. 3 schematically shows a second exemplary embodiment of a method according to the present invention for adjusting the combustion start via a closed loop.

FIG. 2 thus represents a formation of a control start for an injector 22, which occurs in an open control chain and which is based on specifying a default setpoint value of the combustion start from which a control start is formed with the aid of a computing model of the ignition delay. As an alternative, the control start may also be formed and corrected in a closed loop. Such a closed loop is depicted in FIG. 3. The object of FIG. 3 differs from the object of FIG. 2 by elements 66, 68, and 70. The same reference numerals identify the same objects. In node 66, a system deviation is formed from the setpoint value of the combustion start and an actual value of the combustion start. Actual value BB_actual is ascertained by processing the signals from one or both combustion feature sensors 32, 34. A regulator 68 processes the system deviation to form a manipulated variable which in the embodiment of FIG. 3 is linked to the setpoint value of the combustion start in a node 70. It is understood that node 70 may also be situated between nodes 56 and 60 or between node 60 and block 62.

What is claimed is:

1. A method for controlling a fuel injector of a diesel engine having a predefined control time from a control start, the method comprising:
   determining a setpoint value for a combustion start of a combustion chamber charge of the diesel engine as a function of at least one of a rotational speed and a torque request defined by a driver intent, and an operating mode;
   estimating an ignition delay between the control start and the combustion start from performance parameters of the diesel engine using a computing model; and
   forming the control start based on the setpoint value of the combustion start and the estimated ignition delay.

2. The method of claim 1, wherein actual values of the combustion start are determined and adjusted to setpoint values in a closed loop.

3. The method of claim 2, wherein the ignition delay is estimated using a computing model, which simulates combined effects of at least two performance parameters of the diesel engine.

4. The method of claim 3, wherein one of the at least two performance parameters includes an exhaust gas recirculation rate.

5. The method of claim 4, wherein the at least two performance parameters include at least one of a combustion chamber charge and a temperature of the combustion chamber charge.

6. The method of claim 4, wherein an inert gas content in a combustion chamber charge resulting from the exhaust gas recirculation is considered in estimating an effect of the combustion chamber charge on the ignition delay.

7. The method of claim 4, wherein a temperature increase of the combustion chamber charge resulting from the exhaust gas recirculation rate is considered in estimating an influence of the temperature of the combustion chamber charge.

8. The method of claim 4, wherein the at least two performance parameters include at least one of a combustion chamber charge and a temperature of the combustion chamber charge, and wherein an inert gas content in a combustion chamber charge resulting from the exhaust gas recirculation is considered in estimating an effect of the combustion chamber charge on the ignition delay.

9. The method of claim 8, wherein a temperature increase of the combustion chamber charge resulting from the exhaust gas recirculation rate is considered in estimating an influence of the temperature of the combustion chamber charge.

10. A control unit to control a fuel injector of a diesel engine having a predefined control time from a control start, comprising:
    a determining arrangement to determine a setpoint value of a combustion start of a combustion chamber charge of the diesel engine as a function of at least one of a rotational speed and a torque request define by a driver intent, and an operating mode; and
    another determining arrangement to estimate an ignition delay between the control start and the combustion start from performance parameters of the diesel engine, and to form the control start from the setpoint value of the combustion start and the estimated ignition delay.

11. The control unit of claim 10, wherein actual values of the combustion start are determined and adjusted to setpoint values in a closed loop.

12. The control unit of claim 11, wherein the ignition delay is estimated using a computing model, which simulates combined effects of at least two performance parameters of the diesel engine.

13. The control unit of claim 12, wherein one of the at least two performance parameters includes an exhaust gas recirculation rate.

14. The control unit of claim 13, wherein the at least two performance parameters include at least one of a combustion chamber charge and a temperature of the combustion chamber charge.

15. The control unit of claim 13, wherein an inert gas content in a combustion chamber charge resulting from the exhaust gas recirculation is considered in estimating an effect of the combustion chamber charge on the ignition delay.

16. The control unit of claim 13, wherein a temperature increase of the combustion chamber charge resulting from the exhaust gas recirculation rate is considered in estimating an influence of the temperature of the combustion chamber charge.

17. The control unit of claim 13, wherein the at least two performance parameters include at least one of a combustion chamber charge and a temperature of the combustion chamber charge, and wherein an inert gas content in a combustion chamber charge resulting from the exhaust gas recirculation is considered in estimating an effect of the combustion chamber charge on the ignition delay.

18. The control unit of claim 17, wherein a temperature increase of the combustion chamber charge resulting from the exhaust gas recirculation rate is considered in estimating an influence of the temperature of the combustion chamber charge.

* * * * *

UNITED STATES PATENT AND TRADEMARK OFFICE
CERTIFICATE OF CORRECTION

PATENT NO. : 8,571,784 B2  Page 1 of 1
APPLICATION NO. : 12/085970
DATED : October 29, 2013
INVENTOR(S) : Polach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1520 days.

Signed and Sealed this
Twenty-second Day of September, 2015

Michelle K. Lee
*Director of the United States Patent and Trademark Office*